United States Patent [19]

McDowell et al.

[11] Patent Number: 4,817,969

[45] Date of Patent: Apr. 4, 1989

[54] GASKET AND METHOD OF MAKING SAME

[75] Inventors: Donald J. McDowell, Riverside, Ill.; Michael J. Maloney, Madison, Wis.; Jerri L. Cooper, Lombard; Lawrence Pyle, Deerfield, both of Ill.

[73] Assignee: Fel-Pro Incorporated, Skokie, Ill.

[21] Appl. No.: 123,219

[22] Filed: Nov. 20, 1987

[51] Int. Cl.$^4$ .............................................. F16J 15/12
[52] U.S. Cl. .................. 277/235 B; 277/166
[58] Field of Search ............... 277/1, 166, 235 B, 227; 264/119

[56] References Cited

U.S. PATENT DOCUMENTS

| | | | |
|---|---|---|---|
| 3,866,926 | 2/1975 | Traum | 277/166 |
| 3,939,892 | 2/1976 | Farnam et al. | 277/166 X |
| 4,145,509 | 3/1979 | Bhatia | 277/166 X |
| 4,284,479 | 8/1981 | Schulte | 277/1 |
| 4,388,259 | 6/1983 | Jewell et al. | 264/153 |
| 4,428,593 | 1/1984 | Pearlstein | 277/235 B |
| 4,535,999 | 8/1985 | Locacius | 277/166 X |
| 4,575,578 | 3/1986 | Bogan et al. | 277/189 X |
| 4,635,949 | 1/1987 | Lucas et al. | 277/235 B |
| 4,748,075 | 5/1988 | Beyer et al. | 277/235 B X |

FOREIGN PATENT DOCUMENTS 0041906 11/1984 European Pat. Off. .
2803932 8/1979 Fed. Rep. of Germany ... 277/235 B

*Primary Examiner*—Donald A. Griffin
*Attorney, Agent, or Firm*—Dressler, Goldsmith, Shore, Sutker & Milnamow, Ltd.

[57] ABSTRACT

A gasket such as a cylinder head gasket molded of an amorphous fiber reinforced thermoplastic resin composite having at least 3% by weight of reinforcing fibers, and having an integral non-elastomeric sealing bead extending above the gasket body and surrounding at least one service opening, and a method of making such a gasket.

38 Claims, 1 Drawing Sheet

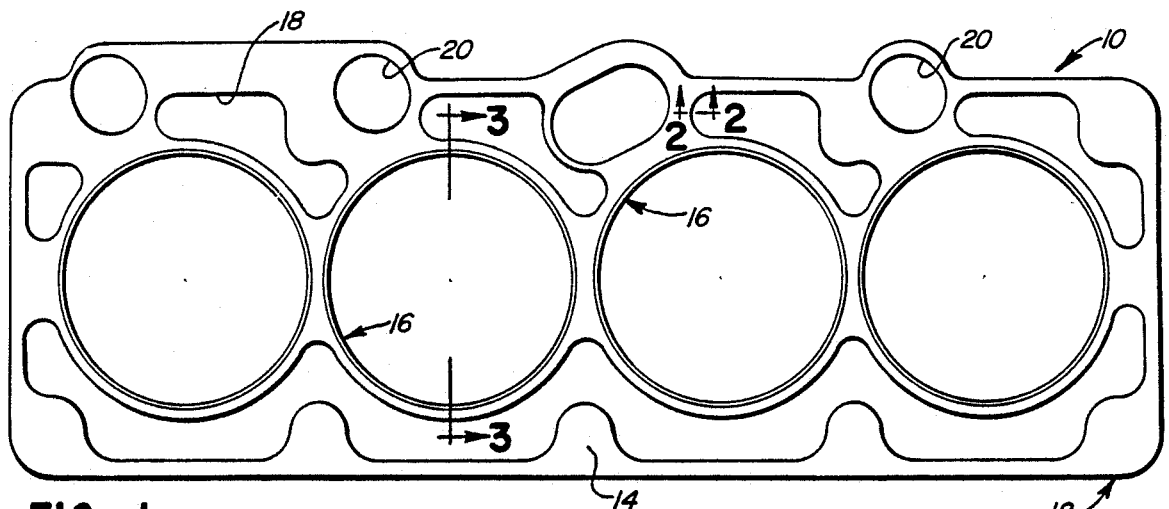
FIG. 1
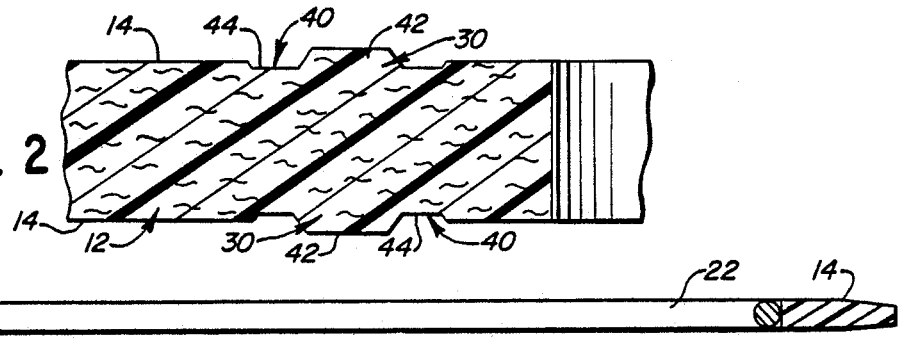
FIG. 2
FIG. 3
FIG. 4
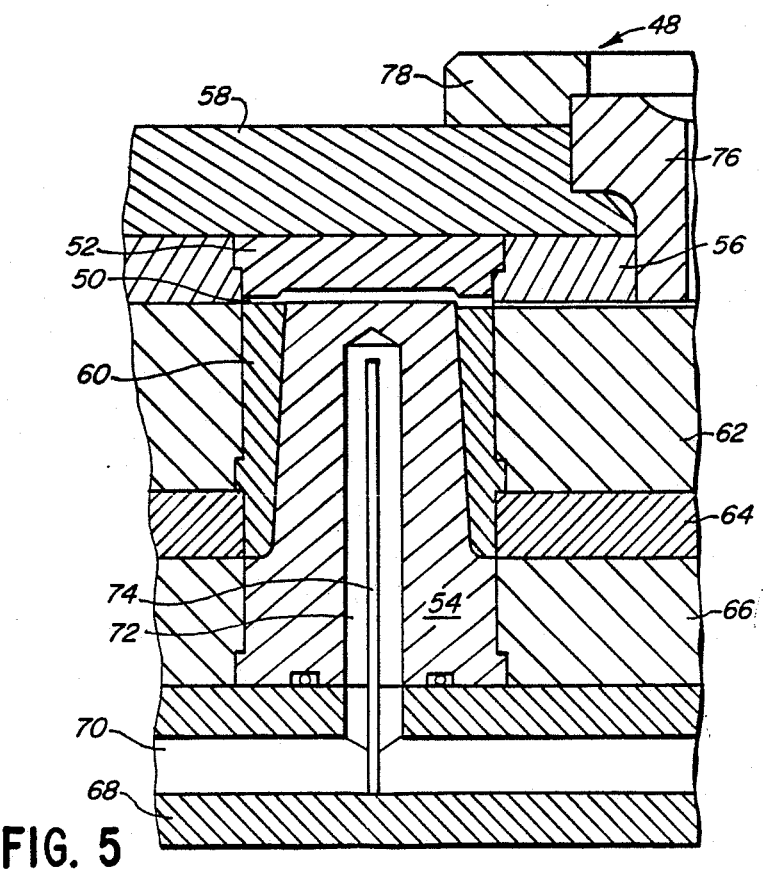
FIG. 5

GASKET AND METHOD OF MAKING SAME

BACKGROUND OF THE INVENTION

The present invention relates to gaskets and especially to high temperature gaskets such as head gaskets to be used in sealing the head and block of an internal combustion engine, as well as to other gaskets used in association with such engines, particularly where high service temperatures are encountered. Gaskets used in environments where high service temperatures are encountered, as in air compressors, may also be produced in accordance with this invention.

The sealing of an internal combustion engine is a complex and difficult matter. High temperatures and pressure which are localized and which vary across the surface of the gasket between the block and the head require differing treatments at different areas, and usually require the use of sealing aids such as grommets, elastomeric seals, armoring and the like. High temperature engineering resins and composites have been suggested for head gaskets, apparently primarily as a spacer with, however, elastomeric seals being required, as exemplified by U.S. Pat. No. 4,635,949. U.S. Pat. No. 4,635,949 does not teach or suggest that the resin described have sealing characteristics or properties which are adequate to provide an effective seal in a head gasket or other product.

SUMMARY OF THE INVENTION

The invention of the present application comprises a non-asbestos gasketing material and in particular comprises fiber reinforced thermoplastic composite gasketing materials which are integrally formed to provide sealing beads which directly seal automotive engine openings, such as oil and coolant ports, without the need for auxiliary or added sealing aids thereat. Thus the integrally formed gaskets of the present invention, and in particular the sealing beads formed therewith and used for sealing purposes, have a high sealing stress retention characteristic. Thus under compressive loads, the integrally formed sealing beads themselves maintain an effective seal and avoid stress relaxation sufficiently to avoid losing an effective seal.

In accordance with the present invention an improved gasket is provided. In a preferred form the gasket is a cylinder head gasket for an internal combustion engine having a head, a block, at least one combustion chamber and at least one passage for fluid communication between the head and the block. The cylinder head gasket comprises an integrally molded thin main gasket body having expansive main surfaces and defining a plurality of openings including at least one combustion opening and at least one aperture for fluid communication between the head and the block of an internal combustion engine, the main gasket body being molded of a fiber reinforced thermoplastic resin composite.

The thermoplastic resin component of the composite, in an unfilled state, has a high heat distortion temperature of at least 347° F. at 264 psi (according to ASTM Test D648), is essentially inert to water, and to automotive fuels, coolants and oils, and is substantially amorphous, having an aromatic backbone, having a flexural modulus of at least about 250,000 psi, and having a relatively high elongation to promote sealing.

The resin is filled and reinforced with fibers in an amount of at least 3% by weight of the unfilled resin, the fibers having a higher stiffness and strength than the unfilled resin and being deformable in tension, compression and bending under transverse loading without fracturing. The fibers further preferably have a tensile modulus of not less than $10 \times 10^6$ psi at 260° C., and induce a beneficial distribution of loads, between the fibers and the resin, to which the gasket is subjected in use. Further, the fibers have good bonding to the resin and having a higher modulus and strength than the unfilled resin to sustain a larger proportion of load, and thereby to provide high sealing stress retention and to prevent torque loss in use by reducing the stress relaxation of the unreinforced resin.

The fibers are random in orientation and short in length and have an aspect ratio of at least 20.

As molded the main gasket body has an integrally formed non-elastomeric sealing bead extending above the main gasket body and surrounding at least one of said plurality of openings.

Most desirably the thermoplastic resin is substantially amorphous, and preferably comprises one of a polyether sulfone and a polyether imide.

The main gasket body may include a filler, such as a fluorinated hydrocarbon polymer.

The preferred fibers comprise one of glass fibers, carbon fibers, metal fibers and ceramic fibers and combinations thereof, said fibers being surface bonded with the resin, desirably have an aspect ratio of at least 100, and are present in an amount of no more than about 50% by weight of the main gasket body.

To selectively enhance one of the compressive and tensile strength characteristics of the gasket in local zones, a portion of the fibers in selected local zones of the main gasket body are selectively oriented, and in a head gasket most preferably the majority of the fibers are oriented generally parallel to the peripheral edges of the combustion openings in the zones at which combustion openings are closely adjacent.

The cylinder head gasket preferably has an armor, such as a wire, molded in situ with the main gasket body.

Desirably the integrally formed sealing bead is generally trapezoidal in cross-section and extends above the surface of the main body a distance of from at least 5% to 15% of the thickness of the main body. To enhance the sealing characteristics of the gasket bead the main gasket body defines a recess in the main gasket body immediately adjacent to the sealing bead, the recess preferably having a depth of no more than 10% of the thickness of the main body. In a preferred form, a pair of immediately adjacent recesses straddling the bead are present. The thickness of the main gasket body may be non-uniform thereby to provide a contour to distribute stress more uniformly.

This invention also embraces a method of producing baskets as described, including the steps of providing and closing a mold to define a cavity for defining a gasket having a main body defining at least one combustion opening, at least two apertures for fluid passage therethrough, and a bead surrounding each aperture, and introducing a thermoplastic resin composite as just described into the mold, then cooling and removing said gasket from the mold.

In a preferred form the method comprises the further step of positioning an armor for the combustion opening in the mold prior to introducing the thermoplastic resin composite into the mold, and closely contacting the armor by mold surfaces to prevent thermoplastic resin composite from flowing over opposed sealing faces of the armor. The armor may be deformed by the mold surfaces upon closing of the mold.

Preferably the thermoplastic resin composite is introduced into the mold to align the fibers adjacent to the combustion opening principally in the direction of the peripheral edges of the combustion opening, and where the mold defines at least two adjacent combustion openings, the thermoplastic resin composite is introduced in the space between adjacent combustion openings in a direction such that the fibers are principally aligned to parallel the respective peripheral edges of the combustion openings to maximize strength of the gasket thereat.

Further objects, features, and advantages will become apparent from the following description and drawings.

BRIEF DESCRIPTION OF THE DRAWINGS

FIG. 1 is an automotive head gasket formed in accordance with the present invention;

FIG. 2 is an enlarged cross-sectional view taken substantially along line 2—2 of FIG. 1;

FIG. 3 is a cross-sectional view taken along line 3—3 of FIG. 1 showing that the gasket body may be of a variable thickness;

FIG. 4 is an enlargement of a portion of FIG. 3 showing how an armor may be shaped in the mold used to form the gasket of FIG. 1; and FIG. 5 is a schematic showing of a mold used to form the gasket of FIG. 1.

DESCRIPTION OF THE PREFERRED EMBODIMENTS

As will be apparent, the present invention comprises gaskets, and particularly automotive gaskets which utilize fiber reinforced thermoplastic resin composites having particular characteristics.

Fiber reinforced thermoplastic resin composites are characterized by high strength, high stiffness, light weight and many other properties that make them attractive structural materials. However, gasketing applications, such as head gasket applications, have such a diverse range of conditions of temperatures and pressure which must be dealt with, that it was not previously apparent if or how these composites might have sealing characteristics or be employed for such applications, particularly one with widely diverse conditions across the expanse of a gasket. The present invention makes use of appropriate properties of the constituent materials of a composite obtained through a careful selection of fibers and resinous matrix material. The resin itself serves as the relatively soft sealing material, whereas the fibers provide, inter alia, the stress relaxation and heat resistance characteristics of the composite. The resin itself does not have the structural characteristics necessary to produce an effective gasket, and whatever the structure of the resin might be, it is generally inadequate for service as a gasket itself under high temperature and pressure conditions. Thus, sealability requirements are met through an intelligent design optimized by finite element analysis. The gaskets produced in accordance with the invention require a short production time by virtue of a simplified production process and have vastly improved performance.

The preferred gasket is a cylinder head gasket (as illustrated by FIG. 1) for an engine having a head, a block, at least one combustion cylinder and plural openings for fluid communication between the head and the block. The gasket 10 desirably comprises an integrally formed thin main gasket body 12 having expansive main surfaces 14 defining a plurality of openings including at least one combustion opening 16 and plural apertures 18 for fluid communication between the head and the block of the internal combustion engine, as well as bolt holes 20. The main gasket body is integrally formed, as by injection molding, of a thermoplastic resin composite. The thermoplastic resin in an unfilled state has a high heat distortion temperature of at least about 347° F. at 264 psi (according to ASTM Test D648) and is essentially inert to water and to automotive fuels, coolants and oils.

Those thermoplastic resins which are preferred for use in accordance with the present invention are those which are substantially and primarily amorphous. Amorphous resins are particularly useful for high temperature gasket applications, such as head gaskets. Thus, it is preferred that the resins be isotropic and have the same properties in all directions. This is for several reasons. Among those are the preference that the resin not have a sharp melting point, i.e., that the resin if it melts or tends to melt at all, should not change significantly at a single given temperature. Thus, if localized heating should occur, i.e., should reach the melting point of a crystalline resin, the gasket would fail at that point. With an amorphous resin or one which is primarily amorphous the change in state of the resin would take place over a range of temperatures and would not necessarily fail at a single temperature point. Another advantage of amorphous resins is that in molding they do not go through a sharp liquid/solid transition (and consequent significant volume changes), as distinguished from the liquid/glass transition of amorphous resins, thus providing closer control (and less shrinkage) over the dimensions of the as-molded gasket.

Preferably the resins used in accordance with the present invention have an "aromatic backbone." By the term "aromatic backbone" is meant that the aromatic group is actually a portion of the main chain of the polymer, as distinguished from being a side ring. The resin has a flow flexural modulus of about 250,000 psi and a high ultimate elongation of at least about 25% to provide effective sealing. At present, polyether sulfones and polyether imides which have aromatic backbones and stable ether linkages are preferred. They are resistant to oil, water and fuels such as gasoline and diesel fuel at the operating temperatures and pressures conventionally encountered in typical automotive engines.

Properties of typical unfilled polyether imides are as follows:

TABLE I

|  | Basic Resin | Easy Flow Grade |
|---|---|---|
| Average Molecular Wt. | 20,000–40,000 | 20,000–30,000 |
| Specific Gravity | 1.27 | 1.27 |
| Mold Shrinkage per ⅛" | 0.007" | 0.007" |
| Tensile Strength (psi) | 15,200 | 15,200 |
| Elongation at Break (%) | 60 | 60 |
| Flexural Modulus (psi) | 480,000 | 480,000 |
| Izod Impact Strength |  |  |
| Notched ⅛" (ft. lb./in.) | 1.0 | 0.6 |
| Unnotched ⅛" (ft. lb./in.) | 23–24 | 23–24 |
| Heat Distortion Temp. |  |  |
| 264 psi | 392° F. | 387° F. |
| 66 psi | 410° F. | 405° F. |
| Glass Transition Temp. | 419° F. | 419° F. |

TABLE I-continued

|  | Basic Resin | Easy Flow Grade |
| --- | --- | --- |
| (Tg) | | |

Properties of typical unfilled polyether sulfones are as follows:

TABLE II

|  | Low Viscosity | General Grade | Medium Viscosity | High Viscosity |
| --- | --- | --- | --- | --- |
| Average Molecular Wt. | 14,800 | 17,650 | 22,390 | 26,000 |
| Tensile Strength (psi) | 12–13,000 | 12–13,000 | 12–13,000 | |
| Flexural Modulus (psi) | 350,000 | 350,000 | 350,000 | 350,000 |
| Elongation at Break (%) | 40–80% | 40–80% | 40–80% | 40–80% |
| Izod Impact Strength Notched (ft. lb./in.) | 1.42 | 1.57 | 2.25 | — |
| Heat Distortion Temp. @ (264 psi) | 395° F. | 395° F. | 395° F. | 395° F. |
| Glass Transition Temp. (Tg) | 428° F. | 428° F. | 428° F. | 428° F. |

It appears that the molecular weight of polyethermide and polyether sulfone do not significantly change the physical or functional properties of those resins, such as tensile modulus, flexural modulus, elongation at break, use temperature or heat distortion temperature. However, reinforcing with fibers does significantly and importantly change the overall characteristics of the unfilled resins. Thus in a preferred form, the resin is filled and reinforced with fibers having a higher stiffness and strength than the unfilled resin. The reinforcing fibers cause a very beneficial distribution of load, between fibers and the resin matrix, to which the gasket is subjected in use. Further, the fibers, having good adhesion and bonding to the resin matrix and having a high elastic modulus and tensile strength, support a larger proportion of the applied load and, consequently, prevent torque loss by reducing the stress relaxation which is characteristic of the unreinforced resin. The surface characteristics of the fibers, whether by an added sizing or otherwise, sufficiently bond or adhere to the resin to serve as a reinforcement and to provide other functions referred to.

The fibers should have an aspect ratio of an average of about at least 10 to 15, desirably at least 20 and preferably an aspect ratio in the range of from 50 to 125. The most preferred fiber diameter for glass is about 0.0004 inch. Fibers which are too short will now allow for attaining maximum fiber stress and the fiber may pull out of the fiber-resin bond. For glass fibers with a tensile strength of 250,000 psi, the minimum desirable length is 20 times the diameter, or about 0.008 inch. Preferably and typically the length is at least 100 times the diameter, i.e., at least about 0.04 inch.

The fibrous reinforcement consists of fibers which are high in strength, heat resistance and fatigue resistance. They are typically of low elongation and are low in energy absorption. They are rigid, but are sufficient flexible so that in admixture with the resin they may bend under transverse compression without fracturing. Within their elastic limitations the fibers act to help in maintaining a tight seal and in preventing creep.

Typical properties of a polyetherimide on a filled versus unfilled basis are as follows:

TABLE III

|  | Unreinforced | 20% (glass by weight) | 40% (glass by weight) |
| --- | --- | --- | --- |
| Tensile Strength (psi) | 15,200 | 21,500 | 32,000 |
| Elongation at Break (%) | 60 | 4–5 | 3–4 |
| Flexural Modulus (psi) | 480,000 | 950,000 | 1,600,000 |
| Heat Distortion Temp. at 264 psi | 392/387° F. | 415° F. | 420° F. |

Typical properties of a polyether sulfone on a filled versus unfilled basis are as follows:

TABLE IV

|  | Unfilled | 20% (glass by weight) | 40% (glass by weight) |
| --- | --- | --- | --- |
| Tensile Strength (psi) | 12–13,000 | 18,000 | 22,000 |
| Elongation at Break (%) | 40–80 | 3–4 | 3–4 |
| Flexural Modulus (psi) | 350,000 | 850,000 | 1,600,000 |
| Heat Distortion Temp. at 264 psi | 395° F. | 410° F. | 420° F. |

In order that the gasket retains its torque and other properties at elevated temperatures, it is desirable that the fibers have an tensile modulus of not less than about $10 \times 10^6$ at room temperature. Thus, the fibers should be resistant to tensioning and bending, i.e., should be resistant to deformation. The higher the modulus, the more load the fibers, hence the fiber reinforced resin, will take and the greater the sealing stress retention of the sealing beads will be. Examples of suitable fibers are A-glass, C-glass, E-glass, carbon, graphite, high silica, quartz, and alumina. Typical tensile moduli of suitable fibers include C-glass ($10 \times 10^6$ psi at 260° C.); E-glass ($10.5 \times 10^6$ psi at 260° C.); quartz ($10 \times 10^6$ psi at 260° C.); carbon/graphite (30 to $79 \times 10^6$ psi at room temperature); alumina ($15 \times 10^6$ psi at room temperature); aluminum ($10.6 \times 10^6$ psi at room temperature); and Kevlar 49 ($16 \times 10^6$ psi at 309° F.).

Fibers act as effective reinforcement when their aspect ratio (ratio of length to diameter, l/d) is governed by the following equation[1]:

$$\frac{1}{d} = \frac{S_{fu}}{2Ty}$$

where $S_{fu}$ is the ultimate tensile strength of the fibers and Ty the yield stress of the matrix. For a typical E-glass in a thermoplastic resin matrix, the aspect ratio of fibers should be at least 100. Generally aspect ratios of a minimum of 20 and preferably, in a range of from 50 to 125 are to be preferred, and most preferably a minimum of about 100.

[1] Analysis and Performance of Fiber Composites—by B. D. Agarwal and L. J. Broutman, John Wiley and Sons, N.Y. 1980.

A variety of fibers may be considered for use in for admixture with suitable resins. Thus, fibers having apparent suitable ultimate elongation properties of less than 10% at 500° F. include the following: carbon (0.59–2.0% ultimate elongation at 500° F.); S-2 glass (5.4% ultimate elongation at 500° F.); E glass (4.8% ultimate elongation at 500° F.); S-glass (5.7% ultimate elongation at 500° F.); C glass (4.8% ultimate elongation at 500° F.); quartz (0.17% ultimate elongation at 500° F.); and stainless steel (1.2–1.5% ultimate elongation at 500° F.). Typical thermoplastic resins have ultimte elongations well in excess of 10%, but when reinforced with fibers are well below ultimate elongations of 10%. Examples are the following: polyether sulfone with 20% by weight glass fiber (3% ultimate elongation); polyether imide with 10% by weight glass fiber (6% ultimate elongation); polyether imide with 20% by weight glass fiber (3% ultimate elongation); polyphenylene sulfide with 30% by weight glass fiber (3 to 4% ultimate elongation); polyether ether ketone with 30% by weight glass fiber (4 to 5% ultimate elongation); polyether ether ketone with 30% by weight carbon fiber (2 to 3% ultimate elongation); and polysulfone with 30% by weight carbon fiber (2 to 3% ultimate elongation).

The fibers used as reinforcement have high stiffness, strength, heat resistance and fatigue resistance. However, they are sufficiently deformable so that in the composite of fibers and resin, they may deform (elongate, contract, or bend) without fracturing under the expected transverse compressive loads. During this elastic deformation they store sufficient energy to maintain a tight seal and to prevent creep and torque loss.

It has also been determined that the fibers should be randomly oriented and uniformly distributed in the resin over most of the gasket body to provide the same properties in all directions. However, it has also been determined that in particular locations preferential fiber orientation may significantly and importantly improve the strength and character of the gasket thereat. It is possible to promote selective preferential fiber orientation during molding, such as during injection molding, by controlling the direction of flow and location of the introduction of the resin fiber mixture into the mold.

It has been determined that the orientation of fibers can vary the strength and stiffness of a part (in different sections) by a much as 40%. Thus, with thin sections of say about 0.060", the strength of the discontinuous-glass and carbon fiber reinforced composites increases, which may be substantially attributed to fiber orientation. Thinner sections produce more laminar flow and hence a greater degree of fiber orientation. Fibers are aligned in the direction of applied stress (flow), optimizing the strength in that direction. Thicker sections allow more mixing action in the middle of the melt flow resulting in random fiber orientation.

Further, strengths and fatigue endurance levels are increased when fibers are aligned parallel to the radius of flow.

For thinner parts of 0.050" or less, one dimensional reinforcement can be approached because the part thickness can be less than the fiber length creating forced alignment along the injection axis. In this instance, all fibers are aligned in the flow direction to some extent.

Thus, the fiber-resin mixture should desirably be introduced so that it flows in a direction so as to provide as nearly a one-dimensional orientation, such as parallel to the peripheral edges of the combustion openings and longitudinal or parallel orientation relative to lines which are tangent to the edges of adjacent combustion openings in the spaces between adjacent combustion openings, as may be possible. When the orientation of the fibers is so controlled, the gasket has the maximum composite strength and modulus in the direction of the fiber axis and the gasket strength available in the zone of a head gasket which is otherwise structurally the weakest, namely the narrow zone between adjacent combustion openings, as well as in the other areas surrounding the combustion openings.

The forming of gaskets from engineering resin composites is difficult because of their characteristics. Thus engineering resins with the characteristics required for head gaskets have high melt/flow temperatures and high viscosities in the molten state. As a result, they are inherently difficult to mold in thin sections and in the complex shapes required for head gaskets. The problem is further exacerbated by the advantages to be obtained by controlling reinforcing fiber orientation in certain high stress areas.

The design of head gasket molds for such composites is also complicated by other factors such as the need to minimize strength losses at resin weld lines, the inclusion of combustion opening armors into the gasket during the molding operation, and the inclusion of close tolerance, complex geometry, bead profiles to augment sealing around oil and coolant passages.

As such, the mold gates are positioned and sized in such a way so as to insure that all areas of the part will be adequately filled. Further, flow lengths are minimized in order to maximize weld line strength. Additionally, the gate locations and orientations are positioned so that the reinforcing fibers are oriented predominantly in the direction of stress in the important areas, such as between cylinder openings and in narrow sections which are subject to stress from oil pressure and the like.

It has been determined that the gasket may preferably be armored at the combustion openings to protect the gasket from direct exposure to the combustion gases, particularly when the resin used has a lower heat distortion temperature. The armoring projects the gasket by conducting the heat to the engine head and the block thereby keeping the gasket body cool. In particular head gaskets with in situ molded armoring, such as wire rings of a variety of possible cross-sectional shapes are preferred. In situ inclusion permits the precise and consistent sizing, shaping and location of the armor, both vertically and circumferentially. Desirably the armor or wire ring may be of known materials, such as steel, stainless steel, copper or copper alloys, the latter having excellent heat transfer and dissipation characteristics. Other armoring, such as plasma sprayed metal, ceramics, etc. may be used to provide enhanced heat dissipation and to prevent heat erosion and/or as a sealing aid. Alternatively post-molding installed armoring including overlapping armors or wire rings or both may be employed advantageously. To accommodate metal tolerances, the surface of the gasket body under the armor can be relieved.

The combustion opening armors used in the head gaskets are desirably placed in the mold prior to the injection of the resin and become an integral portion of the gasket after molding. The resin is allowed to flow around a portion of the curved cross section of the armor forming a mechanical lock which secures them tightly in place without the need for adhesive bonding.

The armors 22 are positioned in the mold, as by placing them over inserts located in one half of the mold. Each half of the mold may contain grooves machined into the surfaces of the die to interact with the armor, when the mold is closed, to shape the armor so that the area which comes in contact with the head and block has the desired profile, and has the armor protrude slightly above the surrounding gasket, thereby to accomplish a rigorous seal to prevent the resin from infiltrating the combustion opening or flashing onto the outer surfaces of the armor, where it might interfere with the combustion seal.

In molding polyethersulfone and polyetherimide into gaskets, typical parameters used were the following:

| | |
|---|---|
| Cylinder temperature | 600–700° F. |
| Melt temperature | 675° F. |
| Mold surface temperature | 300° F. |
| Screw speed, RPM | 30–60 |
| Back Pressure, psi | 1,000–1,100 |
| Clamp Pressure, psi | 175 tons |
| Shot Size, mm | 60 |
| Cycle Time, sec | 33 |

Because of the high viscosity of the composites and to make certain the mold was filled, a runner and gating system to be described was employed.

A three plate mold was used which allowed for a runner system with five gates. The gates were positioned such that the knit (or weld) lines were in the least critical positions. The gates were also positioned to force the flow through the space between the combustion openings, thus maximizing the strength in this very important area by forcing the fibers to align themselves (principally in the direction of flow). Selected gasket bolt holes 20 were used as gates.

In addition, in order to mold the required wire ring (armor) into the gasket, a recess was machined into the back side of the mold to accommodate the ring diameters. The shape of the recess was specifically designed to pinch or bite down on the wire to eliminate any possible flash over the wire. The bite helped to prevent inward collapsing or movement of the wire during molding.

The recess geometry also allowed for shaping the armor wire 22. Depending on the engine or application, the wire to be used may be flat, round, elliptical, or otherwise, and may be so shaped, as with flats 24, or may be otherwise modified by modifying the mold or die recess 26.

A typical injection mold 48 adapted for use in connection with the present invention comprises an assemblage defining a cavity 50 for the material to be molded, a cavity plate 52, and a cooperating mold plate 54. Cavity plate 52 is secured with a cavity plate retainer plate 56 and a top clamp plate 58. A stripper bushing 60 secures the mold plate 54, and is held in place by a stripper bushing retainer plate 62, a stripper bushing plate 64, and a mold plate retainer plate 66. A bottom clamp plate 68 may define a water (coolant) way 70 which communicates with a core cooling aperture 72 which may be provided with a baffle 74. The material to be molded passes through a sprue bushing 76 which is held in place by a locating ring 78.

Of course cavity plate 52 and mold plate 54 are configured to define a cavity with a shape complementary to the desired gasket, such as the gasket of FIG. 1, as represented in part by the portion shown in FIG. 4 as defining a recess 26 for the shaping of wire 22.

For the sealing beads 30 to perform their intended sealing functions with thermoplastic resin composites of the types described herein, it was determined that they should protrude above the main surface of the gasket body so that when the gasket is placed in an engine and the bolts are torqued, the beads will deform until they are nearly the same height as the body of the gasket. Deformation of the beads accomplishes two purposes, namely the deformed areas have high unit area loadings which produce good seals, and they are able to conform to small imperfections in either block or head which might otherwise produce leaks. For the beads 30 to perform their intended task in a most efficient manner, it is important that their size and shape be closely controlled during molding.

As such, with a gasket having a body thickness of about 0.060 inch, it was determined that a bead height of about 0.005 inch greater than the body of the gasket in an uncompressed state was ideal. Generally speaking a bead height of from 5% to 15% of the thickness of the main body is to be preferred.

The preferred shape of the beads is trapezoidal in cross-section which assists in distributing stress when the bead is deformed in use. The beads may assume a variety of contours, shapes and height-to-width ratios. Finite element analysis was used to determine the preferred shape. They may define annuli or a selected maze pattern. Preferably they should project from both main surfaces as shown by FIG. 2.

In a preferred form, annular sealing rings may be associated with an adjacent annular recess or straddling annular recesses 40 to accommodate some flow of the resin matrix under high sealing loads, thereby to reduce the possibility of stress cracking of the sealing beads. A depth of 0.003 inch with a gasket of about 0.060 inch in thickness has been found ideal for the recesses, although typically the recesses should be no greater than about 10% of the thickness of the gasket body.

In a situation in which the gasket body thickness is about 0.060 inch and the bead height is about 0.006 inch, it has been determined that the optimum land area 42 or bead width should be about 0.030 inch, i.e., about 5 times the height of the bead. The recess depth may be about, as indicated be about 0.003 inch and the recess shelf 44 or width about 0.015 inch, again about 5 times the recess depth. It is also possible to use other sealing aids, such as conventional surface coatings to provide for microsealing or to accommodate motion.

It is also apparent, in accordance with the present invention, that the gasket body thickness and characteristics may be varied to distribute stress appropriately in the head and block. Thus the thickness and cross-section of the gasket as molded may be varied more effectively to distribute stresses across the gasket when disposed between a head and block. Also, variations in the composite itself may be made in selected gasket locations to contribute to effective stress distribution.

It will be apparent to those skilled in the art from the foregoing that modifications may be made without departing from the spirit of the present invention. Accordingly, the invention is not intended to be limited except as may be dictated by the appended claims.

What is claimed is:

1. A cylinder head gasket for an internal combustion engine having a head, a block, at least one combustion chamber and at least one passage for fluid communication between the head and the block, the cylinder head gasket comprising:

an integrally molded thin main gasket body having expansive main surfaces and defining a plurality of openings including at least one combustion opening and at least one aperture for fluid communication between the head and the block of an internal combustion engine, said main gasket body being molded of a reinforced thermoplastic resin composite, said thermoplastic resin, in an unfilled state, having a high heat distortion temperature of at least 347° F. at 264 psi (according to ASTM Test D648), and being essentially inert to water, and to automotive fuels, coolants and oils, said resin being substantially amorphous and having an aromatic backbone, having a flexural modulus of at least about 250,000 psi and a relatively high elongation to promote sealing, said resin being filled and reinforced with fibers in an amount of at least 3% by weight of the unfilled resin, said fibers having a higher stiffness and strength than said unfilled resin and being deformable in tension, compression and bending under transverse loading without fracturing, said fibers having a tensile modulus of not less than $10 \times 10^6$ psi at 500° F., said fibers serving to distribute loads to which the gasket is subjected in use between the fibers and the resin, said fibers having good bonding to the resin and having a higher modulus and strength than said unfilled resin to sustain a larger proportion of load, and thereby to provide high sealing stress retention and to prevent torque loss in use by reducing the stress relaxation of the unreinforced resin, said fibers being random in orientation and short in length and having an aspect ratio of at least 20, and said main gasket body as molded having an integrally formed non-elastomeric sealing bead extending above the main gasket body and surrounding at least one of said plurality of openings.

2. The cylinder head gasket in accordance with claim 1 and wherein said thermoplastic resin is substantially amorphous.

3. The cylinder head gasket in accordance with claim 1 and wherein said thermoplastic resin is one of a polyether sulfone and a polyether imide.

4. The cylinder head gasket in accordance with claim 1 and where said main gasket body includes a filler to enhance sealability and to facilitate molding of said gasket body.

5. The cylinder head gasket in accordance with claim 4 and wherein said filler comprises a fluorinated hydrocarbon polymer.

6. The cylinder head gasket in accordance with claim 1 and wherein said fibers comprise one of glass fibers, carbon fibers, metal fibers and ceramic fibers and combinations thereof, said fibers being surface bonded with the resin.

7. The cylinder head gasket in accordance with claim 6 and wherein said fibers have an aspect ratio of at least 100.

8. The cylinder head gasket in accordance with claim 6 and wherein said fibers are present in an amount of no more than about 50% by weight of the main gasket body.

9. The cylinder head gasket in accordance with claim 1 and wherein a portion of said fibers in selected local zones of said main gasket body are oriented to selectively enhance one of the compressive and tensile strength characteristics of said gasket in said local zones.

10. The cylinder head gasket in accordance with claim 9, and wherein the majority of the fibers are oriented generally parallel to the peripheral edges of the combustion openings in the zones at which combustion openings are closely adjacent.

11. The cylinder head gasket in accordance with claim 1 and further comprising an armor disposed at the periphery of the combustion opening.

12. The cylinder head gasket in accordance with claim 11 and wherein said armor is molded in situ with said main gasket body.

13. The cylinder head gasket in accordance with claim 12 and wherein said armor comprises a wire molded in situ with said main gasket body.

14. The cylinder head gasket in accordance with claim 11 and wherein said armor comprises a copper wire.

15. The cylinder head gasket in accordance with claim 1 and wherein said main gasket body is injection molded in substantially finished form.

16. A gasket in accordance with claim 1 and wherein said integrally formed sealing bead is generally trapezoidal in cross-section.

17. A gasket in accordance with claim 16, and wherein said sealing bead extends above the surface of the main body a distance of from at least 5% to 15% of the thickness of the main body.

18. The cylinder head gasket in accordance with claim 1 and wherein said main gasket body defines a recess in said main gasket body immediately adjacent to said sealing bead.

19. A gasket in accordance with claim 18, and wherein said recess has a depth of no more than 10% of the thickness of the main body.

20. The cylinder head gasket in accordance with claim 18 and wherein a pair of immediately adjacent recesses straddling said bead are present.

21. A gasket in accordance with claim 1, and wherein the thickness of the main gasket body is non-uniform thereby to provide a contour to distribute stress more uniformly.

22. A gasket comprising:

an integrally molded thin main gasket body having expansive main surfaces defining a plurality of openings including at least one service opening, said gasket body being molded of a reinforced thermoplastic resin composite, said thermoplastic resin, in an unfilled state, having a high heat distortion temperature of at least 347° F. at 264 psi (according to ASTM Test D648), and being essentially inert to water, and to fueld, coolants and oils, said resin being substantially amorphous and having an aromatic backbone, having a flexural modulus of at least about 250,000 psi and a relatively high elongation to promote sealing, said resin being filled and reinforced with fibers in an amount of at least 3% by weight of the unfilled resin, said fibers having a higher stiffness and strength than said unfilled resin and being deformable in tension, compression and bending under transverse loading without fracturing, said fibers having a tensile modulus of not less than $10 \times 10^6$ psi at 500° F., said fibers serving to distribute loads to which the gasket is subjected in use between the fibers and the resin, said fibers having good bonding to the resin and having a higher modulus and strength than said unfilled resin to sustain a larger proportion of load, and thereby to provide high sealing stress retention in use by reducing the stress relaxation of the unreinforced resin, said fibers being random in orientation and short in length and having an aspect ratio of at least 20, and said gasket body as molded having an integrally formed non-elastomeric sealing bead extending above the gasket body and surrounding at least one service opening.

23. The gasket in accordance with claim 22 and wherein said thermoplastic resin is substantially amorphous.

24. The gasket in accordance with claim 22 and wherein said thermoplastic resin is one of a polyether sulfone and a polyether imide.

25. The gasket in accordance with claim 22 and where said main gasket body includes a filler to enhance sealability and to facilitate molding of said gasket body.

26. The gasket in accordance with claim 25 and wherein said filler comprises a fluorinated hydrocarbon polymer.

27. The gasket in accordance with claim 22 and wherein said fibrous reinforcing material comprises one of glass fibers, carbon fibers, metal fibers and ceramic fibers and combinations thereof, said fibers being surface bonded with the resin.

28. The gasket in accordance with claim 27 and wherein said fibers have an aspect ratio of at least 100.

29. The gasket in accordance with claim 27 and wherein said fibers are present in an amount of no more than about 50% by weight of the gasket body.

30. The gasket in accordance with claim 22 and wherein a portion of said fibers in selected local zones of said gasket body are oriented to selectively enhance one of the compressive and tensile strength characteristics of said gasket in said local zones.

31. The gasket in accordance with claim 22 and wherein said gasket body is injection molded in substantially finished form.

32. The gasket in accordance with claim 22 and wherein said main gasket body defines a recess in said main gasket immediately adjacent to said sealing bead.

33. The gasket in accordance with claim 32 and wherein a pair of said recesses straddling said bead are provided.

34. A gasket in accordance with claim 32, and wherein said recess has a depth of no more than 10% of the thickness of the main body.

35. A gasket in accordance with claim 22 and wherein said integrally formed sealing bead is generally trapezoidal in cross-section.

36. A gasket in accordance with claim 35, and wherein said sealing bead extends above the surface of the main body a distance of from at least 5% to 15% of the thickness of the main body.

37. A gasket in accordance with claim 22, and wherein the thickness of the main gasket body is nonuniform thereby to provide a contour to distribute stress more uniformly.

38. The gasket in accordance with claim 22, and further comprising an armor disposed in at least one service opening.

* * * * *